United States Patent
Lee et al.

(10) Patent No.: US 8,135,585 B2
(45) Date of Patent: Mar. 13, 2012

(54) METHOD AND AN APPARATUS FOR PROCESSING A SIGNAL

(75) Inventors: Hyun Kook Lee, Seoul (KR); Sung Yong Yoon, Seoul (KR); Dong Soo Kim, Seoul (KR); Jae Hyun Lim, Seoul (KR)

(73) Assignee: LG Electronics Inc., Seoul (KR)

(*) Notice: Subject to any disclaimer, the term of this patent is extended or adjusted under 35 U.S.C. 154(b) by 399 days.

(21) Appl. No.: 12/497,119

(22) Filed: Jul. 2, 2009

(65) Prior Publication Data

US 2010/0070272 A1 Mar. 18, 2010

Related U.S. Application Data

(63) Continuation of application No. PCT/KR2009/001081, filed on Mar. 4, 2009.

(60) Provisional application No. 61/033,715, filed on Mar. 4, 2008, provisional application No. 61/078,762, filed on Jul. 7, 2008.

(51) Int. Cl.
*G10L 19/04* (2006.01)
(52) U.S. Cl. .......... 704/219; 704/229; 704/200.1; 704/230; 704/220; 704/205; 375/243; 375/241; 370/509
(58) Field of Classification Search .......... 704/219, 704/229, 200.1, 203, 230, 205, 226, 224, 704/220, 500–504; 375/243, 241; 713/176; 370/509
See application file for complete search history.

(56) References Cited

U.S. PATENT DOCUMENTS

| 5,303,374 | A | * | 4/1994 | Mitsuhashi et al. | 704/212 |
| 5,321,793 | A | * | 6/1994 | Drogo De Iacovo et al. | 704/220 |
| 5,371,853 | A | * | 12/1994 | Kao et al. | 704/200.1 |
| 5,481,614 | A | * | 1/1996 | Johnston | 381/2 |
| 5,537,510 | A | * | 7/1996 | Kim | 704/229 |
| 5,579,404 | A | * | 11/1996 | Fielder et al. | 381/106 |
| 5,706,396 | A | * | 1/1998 | Schroder et al. | 704/228 |
| 5,742,735 | A | * | 4/1998 | Eberlein et al. | 704/229 |
| 5,777,992 | A | * | 7/1998 | Lokhoff | 370/389 |

(Continued)

FOREIGN PATENT DOCUMENTS

EP 1 688 917 A1 8/2006

(Continued)

OTHER PUBLICATIONS

Kim et al., "The Trend of G.729.1 Wideband Multi-codec Technology," ETRI (Electronics and Telecommunications Research Institute), Dec. 2006, vol. 21, No. 6, pp. 77-85, including English abstract.

*Primary Examiner* — Vijay B Chawan
(74) *Attorney, Agent, or Firm* — Birch, Stewart, Kolasch & Birch, LLP

(57) ABSTRACT

An apparatus and method for processing an encoded signal are discussed. The method includes: if a coding type of an audio signal is a mixed signal coding type, extracting spectral data and a linear predictive coefficient from the audio signal; generating a residual signal for the linear prediction by performing an inverse frequency conversion on the spectral data; reconstructing the audio signal by performing a linear prediction coding on the linear predictive coefficient and the residual signal; and reconstructing a high frequency region signal using an extension base signal corresponding to a partial region of the reconstructed audio signal and band extension information.

15 Claims, 8 Drawing Sheets

U.S. PATENT DOCUMENTS

| | | | |
|---|---|---|---|
| 5,778,335 A | 7/1998 | Ubale et al. | |
| 6,061,793 A * | 5/2000 | Tewfik et al. | 713/176 |
| 6,094,636 A * | 7/2000 | Kim | 704/500 |
| 6,101,475 A * | 8/2000 | Keyhl et al. | 704/503 |
| 6,108,625 A * | 8/2000 | Kim | 704/229 |
| 6,108,626 A * | 8/2000 | Cellario et al. | 704/230 |
| 6,208,962 B1 | 3/2001 | Ozawa | |
| RE38,269 E * | 10/2003 | Liu | 704/227 |
| 7,493,255 B2 * | 2/2009 | Al-Naimi et al. | 704/219 |
| 7,895,046 B2 * | 2/2011 | Andersen et al. | 704/503 |
| 2005/0278169 A1 * | 12/2005 | Hardwick | 704/223 |
| 2009/0234645 A1 * | 9/2009 | Bruhn | 704/205 |
| 2010/0070284 A1 * | 3/2010 | Oh et al. | 704/500 |

FOREIGN PATENT DOCUMENTS

| | | |
|---|---|---|
| KR | 10-2007-0012194 A | 1/2007 |
| KR | 10-2007-0019739 A | 2/2007 |
| WO | WO-02/05433 A1 | 1/2002 |

* cited by examiner (A)

(B)

METHOD AND AN APPARATUS FOR PROCESSING A SIGNAL

This application is a continuation of PCT/KR2009/001081 filed on Mar. 4, 2009, which claims priority under 35 U.S.C. §119(e) on U.S. Provisional Application Nos. 61/033,715 filed on Mar. 4, 2008, and 61/078,762 filed on Jul. 7, 2008, respectively, all of which are hereby expressly incorporated by reference into the present application.

BACKGROUND OF THE INVENTION

1. Field of the Invention

The present invention relates to an audio signal processing apparatus for encoding and decoding various kinds of audio signals effectively and method thereof.

2. Discussion of the Related Art

Generally, coding technologies are conventionally classified into two types such as perceptual audio coders and linear prediction based coders. For instance, the perceptual audio coder optimized for music adopts a scheme of reducing an information size in a coding process using the masking principle, which is human aural psychoacoustic theory, on a frequency axis. On the contrary, the linear prediction based coder optimized for speech adopts a scheme of reducing an information size by modeling speech vocalization on a time axis.

However, each of the above-described technologies has good performance on each optimized audio signal (e.g., a speech signal, a music signal) but fails to provide consistent performance on an audio signal generated from complicatedly mixing different types of audio signals or speech and music signals together.

SUMMARY OF THE INVENTION

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which different types of audio signals can be compressed and/or reconstructed in higher efficiency.

Another object of the present invention is to provide an audio coding scheme suitable for characteristics of an audio signal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing an audio signal according to the present invention includes the steps of identifying whether a coding type of the audio signal is a music signal coding type using first type information, if the coding type of the audio signal is not the music signal coding type, identifying whether the coding type of the audio signal is a speech signal coding type or a mixed signal coding type using second type information, if the coding type of the audio signal is the mixed signal coding type, extracting spectral data and a linear predictive coefficient from the audio signal, generating a residual signal for linear prediction by performing inverse frequency conversion on the spectral data, reconstructing the audio signal by performing linear prediction coding on the linear predictive coefficient and the residual signal, and reconstructing a high frequency region signal using an extension base signal corresponding to a partial region of the reconstructed audio signal and band extension information.

To further achieve these and other advantages and in accordance with the purpose of the present invention, an apparatus for processing an audio signal includes a demultiplexer extracting first type information and second type information from a bitstream, a decoder determining unit identifying whether a coding type of the audio signal is a music signal coding type using first type information, the decoder, if the coding type of the audio signal is not the music signal coding type, identifying whether the coding type of the audio signal is a speech signal coding type or a mixed signal coding type using second type information, the decoder then determining a decoding scheme, an information extracting unit, if the coding type of the audio signal is the mixed signal coding type, extracting spectral data and a linear predictive coefficient from the audio signal, a frequency transforming unit generating a residual signal for linear prediction by performing inverse frequency conversion on the spectral data, a linear prediction unit reconstructing the audio signal by performing linear prediction coding on the linear predictive coefficient and the residual signal, and a bandwidth extension decoding unit reconstructing a high frequency region signal using an extension base signal corresponding to a partial region of the reconstructed audio signal and band extension information.

Preferably, the audio signal includes a plurality of subframes and wherein the second type information exists by a unit of the subframe.

Preferably, a bandwidth of the high frequency region signal is not equal to that of the extension base signal. Preferably, the band extension information includes at least one of a filter range applied to the reconstructed audio signal, a start frequency of the extension base signal and an end frequency of the extension base signal.

Preferably, if the coding type of the audio signal is the music signal coding type, the audio signal comprises a frequency-domain signal, wherein if the coding type of the audio signal is the speech signal coding type, the audio signal comprises a time-domain signal, and wherein if the coding type of the audio signal is the mixed signal coding type, the audio signal comprises an MDCT-domain signal.

Preferably, the linear predictive coefficient extracting includes extracting a linear predictive coefficient mode and extracting the linear predictive coefficient having a variable bit size corresponding to the extracted linear predictive coefficient mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

In the present invention, terminologies in the present invention can be construed as the following references. First of all, 'coding' can be occasionally construed as encoding or decoding. Information is a terminology that includes values, parameters, coefficients, elements and the like.

Regarding the present invention, 'audio signal' in the present invention is conceptionally discriminated from a video signal. And, the audio signal indicates all signals that can be aurally identified in reproduction. Therefore, audio signals can be classified into a speech signal mainly relevant to human vocalization or a signal similar to the speech signal (hereinafter named 'speech signal'), a music signal mainly relevant to a mechanical noise and sound or a signal similar to the music signal (hereinafter named 'music signal'), and a 'mixed signal' generated from mixing the speech signal and the music signal together. The present invention intends to provide an apparatus for encoding/decoding the above three types of audio signals and method thereof in order to encode/decode the audio signals to be suitable for characteristics of the audio signals. Yet, the audio signals are classified for the description of the present invention only. And, it is apparent that the technical idea of the present invention is identically applicable to a case of classifying the audio signal according to a different method.

Figure 1:
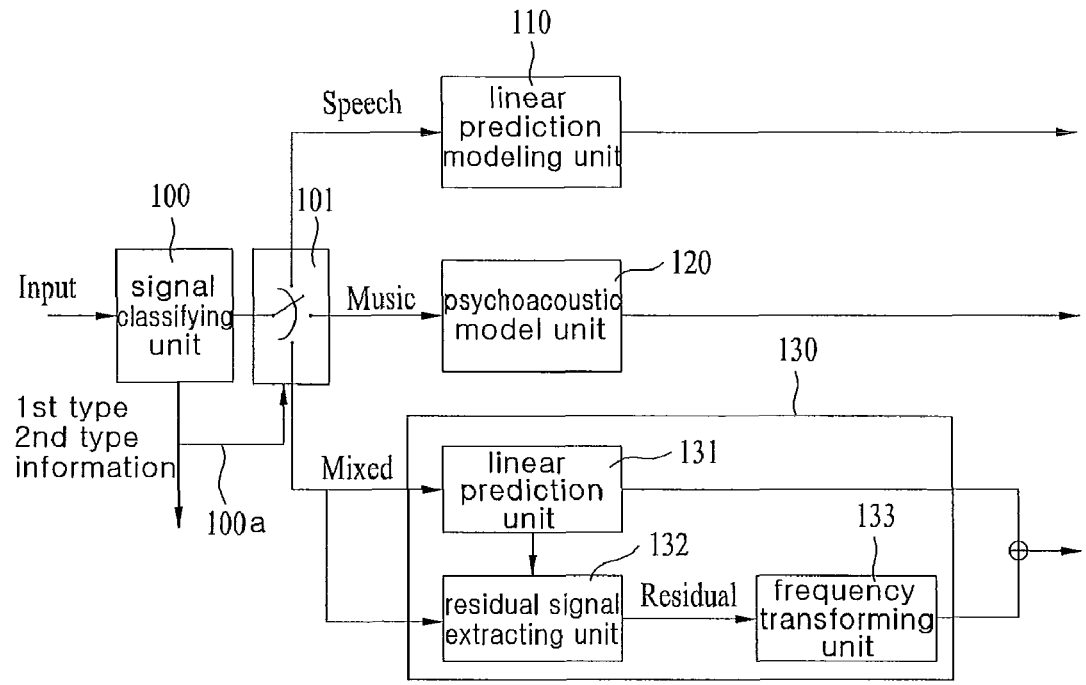
FIG. 1 is a block diagram of an audio coding apparatus according to one embodiment of the present invention.

FIG. 1 is a block diagram of an audio coding apparatus according to one preferred embodiment of the present invention. In particular, FIG. 1 shows a process of classifying an inputted audio signal according to a preset reference and then coding the classified audio signal by selecting an audio coding scheme suitable for the corresponding audio signal.

Referring to FIG. 1, an audio coding apparatus according to one preferred embodiment of the present invention includes a signal classifying unit (sound activity detector) 100 classifying an inputted audio signal into a type of a speech signal, a music signal or a mixed signal of speech and music by analyzing a characteristic of the inputted audio signal, a linear prediction modeling unit 110 coding the speech signal of the signal type determined by the signal classifying unit 100, a psychoacoustic model unit 120 coding the music signal, and a mixed signal modeling unit 130 coding the mixed signal of speech and music. And, the audio coding apparatus can further include a switching unit 101 configured to select a coding scheme suitable for the audio signal classified by the signal classifying unit 100. The switching unit 101 is operated using audio signal coding type information (e.g., first type information and second type information, which will be explained in detail with reference to FIG. 2 and FIG. 3) generated by the signal classifying unit 100 as a control signal. Moreover, the mixed signal modeling unit 130 can include a linear prediction unit 131, a residual signal extracting unit 132 and a frequency transforming unit 133. In the following description, the respective elements shown in FIG. 1 are explained in detail.

First of all, the signal classifying unit 100 classifies a type of an inputted audio signal and then generates a control signal to select an audio coding scheme suitable for the classified type. For instance, the signal classifying unit 100 classifies whether an inputted audio signal is a music signal, a speech signal or a mixed signal of speech and music. Thus, the type of the inputted audio signal is classified to select an optimal coding scheme per audio signal type from audio coding schemes which will be explained later. Therefore, the signal classifying unit 100 performs a process of analyzing an inputted audio signal and then selecting an audio coding scheme optimal for the inputted audio signal. For instance, the signal classifying unit 100 generates audio coding type information by analyzing an inputted audio signal. The generated audio coding type information is utilized as a reference for selecting a coding scheme. The generated audio coding type information is included as a bitstream in a finally-coded audio signal and is then transferred to a decoding or receiving device. Besides, a decoding method and apparatus using the audio coding type information will be explained in detail with reference to FIGS. 6 to 8 and FIG. 11. Moreover, the audio coding type information generated by the signal classifying unit 100 can include first type information and second type information for example. This will be described with reference to FIG. 4 and FIG. 5.

The signal classifying unit 100 determines an audio signal type according to a characteristic of an inputted audio signal. For instance, if the inputted audio signal is a signal better for modeling with a specific coefficient and a residual signal, the signal classifying unit 100 determines the inputted audio signal as a speech signal. If the inputted audio signal is a signal poor for modeling with a specific coefficient and a residual signal, the signal classifying unit 100 determines the inputted audio signal as a music signal. If it is difficult to determine the inputted audio signal as a speech signal or a music signal, the signal classifying unit 100 determines the inputted audio signal as a mixed signal. Regarding a detailed determination reference, for example, when the signal is modeled with a specific coefficient and a residual signal, if an energy level ratio of the residual signal to the signal is smaller than a preset reference value, the signal can be determined as a signal good for modeling. Therefore, the signal can be determined as a speech signal. If the signal has high redundancy on a time axis, the signal can be determined as a signal good for modeling by linear prediction for predicting a current signal from a past signal. Therefore, the signal can be determined as a music signal.

If a signal inputted according to this reference is determined as a speech signal, it is able to code an input signal using a speech coder optimized for the speech signal. According to the present embodiment, the linear prediction modeling unit 100 is used for a coding scheme suitable for a speech signal. The linear prediction modeling unit 100 is provided with various schemes. For instance, ACELP (algebraic code excited linear prediction) coding scheme, AMR (adaptive multi-rate) coding scheme or AMR-WB (adaptive multi-rate wideband) coding scheme is applicable to the linear prediction modeling unit 110.

The linear prediction modeling unit 110 is able to perform linear prediction coding on an inputted audio signal by frame unit. The linear prediction modeling unit 110 extracts a predictive coefficient per frame and then quantizes the extracted predictive coefficient. For instance, a scheme of extracting a predictive coefficient using 'Levinson-Durbin algorithm' is widely used in general.

In particular, if an inputted audio signal is constructed with a plurality of frames or there exist a plurality of super frames, each of which has a unit of a plurality of frames, for example, it is able to determine whether to apply a linear prediction modeling scheme per frame. It is possible to apply a different linear prediction modeling scheme per unit frame existing within one super frame or per subframe of a unit frame. This can raise coding efficiency of an audio signal.

Meanwhile, if an inputted audio signal is classified into a music signal by the signal classifying unit 100, it is able to code an input signal using a music coder optimized for the music signal. The psychoacoustic modeling unit 120 is configured based on a perceptual audio coder.

Meanwhile, if an inputted audio signal is classified into a mixed signal, in which speech and music are mixed together, by the signal classifying unit 100, it is able to code an input signal using a coder optimized for the mixed signal. According to the present embodiment, the mixed signal modeling unit 130 is used for a coding scheme suitable for a mixed signal.

The mixed signal modeling unit 130 is able to perform coding by a mixed scheme resulting from mixing the aforesaid linear prediction modeling scheme and the psychoacoustic modeling scheme together. In particular, the mixed signal modeling unit 130 performs linear prediction coding on an input signal, obtains a residual signal amounting to a difference between a linear prediction result signal and an original signal, and then codes the residual signal by a frequency transform coding scheme.

For instance, FIG. 1 shows an example that the mixed signal modeling unit 130 includes the linear prediction unit 131, the residual signal extracting unit 132 and the frequency transforming unit 133.

The linear prediction unit 131 performs linear predictive analysis on an inputted signal and then extracts a linear predictive coefficient indicating a characteristic of the signal. The residual signal extracting unit 132 extracts a residual signal, from which a redundancy component is removed, from the inputted signal using the extracted linear predictive coefficient. Since the redundancy is removed from the residual signal, the corresponding residual signal can have a type of a white noise. The linear prediction unit 131 is able to perform linear prediction coding on an inputted audio signal by frame unit. The linear prediction unit 131 extracts a predictive coefficient per frame and then quantizes the extracted predictive coefficient. For instance, in particular, if an inputted audio signal is constructed with a plurality of frames or there exist a plurality of super frames, each of which has a unit of a plurality of frames, it is able to determine whether to apply a linear prediction modeling scheme per frame. It is possible to apply a different linear prediction modeling scheme per unit frame existing within one super frame or per subframe of a unit frame. This can raise coding efficiency of an audio signal.

The residual signal extracting unit 132 receives an input of a remaining signal coded by the linear prediction unit 131 and an input of an original audio signal having passed through the signal classifying unit 100 and then extracts a residual signal that is a difference signal between the two inputted signals.

The frequency transforming unit 133 calculates a masking threshold or a signal-to-mask ratio (SMR) by performing frequency domain transform on an inputted residual signal by MDCT or the like and then codes the residual signal. The frequency transforming unit 133 is able to code a signal of a residual audio tendency using TCX as well as the psychoacoustic modeling.

As the linear prediction modeling unit 100 and the linear prediction unit 131 extract an audio characteristic reflected linear predictive coefficient (LPC) by performing linear prediction and analysis on an inputted audio signal, it is able to consider a scheme of using variable bits for a method of transferring the LPC data.

For instance, an LPC data mode is determined by considering a coding scheme per frame. It is then able to assign a linear predictive coefficient having a viable bit number per the determined LPC data mode. Through this, an overall audio bit number is reduced. Therefore, audio coding and decoding can be performed more efficiently.

Meanwhile, as mentioned in the foregoing description, the signal classifying unit 100 generates coding type information of an audio signal by classifying the audio signal into one of two types of the coding type information, enables the coding type information to be included in a bitstream, and then transfers the bitstream to a decoding apparatus. In the following description, audio coding type information according to the present invention is explained in detail with reference to FIG. 4 and FIG. 5.

Figure 4:
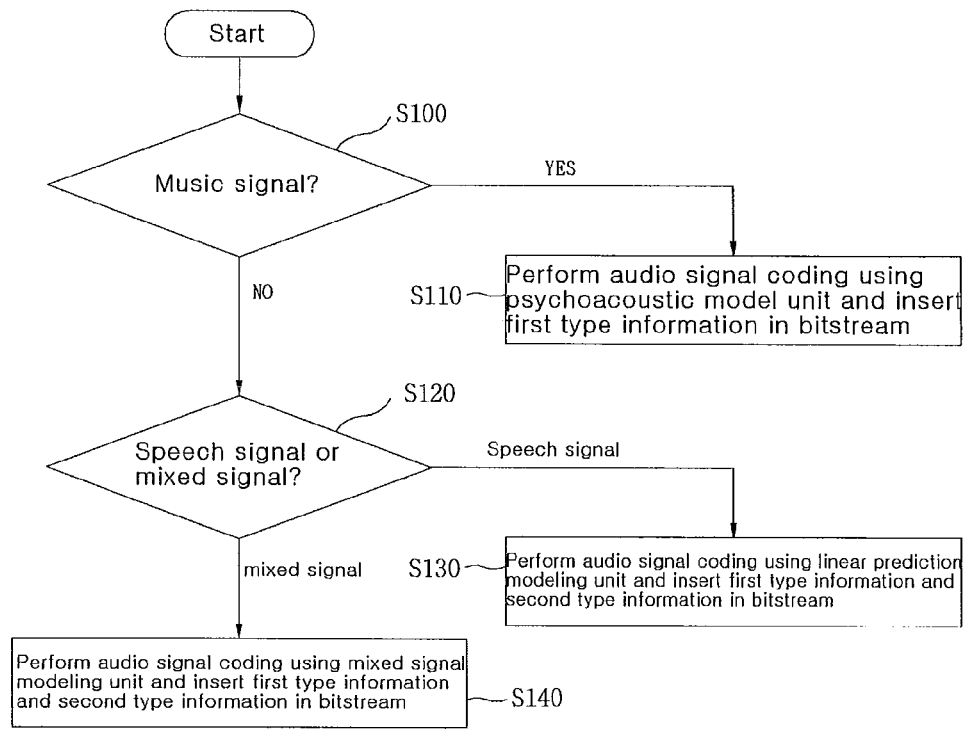
FIG. 4 is a flowchart for a method of coding an audio signal using audio type information according to one embodiment of the present invention.

FIG. 4 is a flowchart for a method of coding an audio signal using audio type information according to one preferred embodiment of the present invention.

First of all, the present invention proposes a method of representing a type of an audio signal in a manner of using first type information and second type information for classification. For instance, if an inputted audio signal is determined as a music signal [S100], the signal classifying unit 100 controls the switching unit 101 to select a coding scheme (e.g., psychoacoustic modeling scheme shown in FIG. 2) suitable for the music signal and then enables coding to be performed according to the selected coding scheme [S110]. Thereafter, the corresponding control information is configured as first type information and is then transferred by being included in a coded audio bitstream. Therefore, the first type information plays a role as coding identification information indicating that a coding type of an audio signal is a music signal coding type. The first type information is utilized in decoding an audio signal according to a decoding method and apparatus.

Moreover, if the inputted signal is determined as a speech signal [S120], the signal classifying unit 100 controls the switching unit 101 to select a coding scheme (e.g., linear prediction modeling shown in FIG. 1) suitable for the speech signal and then enables coding to be performed according to the selected coding scheme [S130]. If the inputted signal is determined as a mixed signal [S120], the signal classifying unit 100 controls the switching unit 101 to select a coding scheme (e.g., mixed signal modeling shown in FIG. 2) suitable for the mixed signal and then enables coding to be performed according to the selected coding scheme [S140]. Subsequently, control information indicating either the speech signal coding type or the mixed signal coding type is configured into second type information. The second type is then transferred by being included in a coded audio bitstream together with the first type information. Therefore, the second type information plays a role as coding identification information indicating that a coding type of an audio signal is either a speech signal coding type or a mixed signal coding type. The second type information is utilized together with the aforesaid first type information in decoding an audio signal according to a decoding method and apparatus.

Regarding the first type information and the second type information, there are two cases according to characteristics of inputted audio signals. Namely, the first information needs to be transferred only or both of the first type information and the second type information need to be transferred. For instance, if a type of an inputted audio signal is a music signal coding type, the first type information is transferred only by being included in a bitstream and the second type information may not be included in the bitstream [(a) of FIG. 5]. Namely, the second type information is included in a bitstream only if an inputted audio signal coding type is a speech signal coding type or a mixed signal coding type. Therefore, it is able to prevent the unnecessary bit number to represent a coding type of an audio signal.

Although the example of the present invention teaches that the first type information indicates a presence or non-presence of a music signal type, it is just exemplary. And, it is apparent that the first type information is usable as information indicating a speech signal coding type or a mixed signal coding type. Thus, by utilizing an audio coding type having probability of high occurrence frequency according to a coding environment to which the present invention is applied, it is able to reduce an overall bit number of a bitstream.

Figure 5:
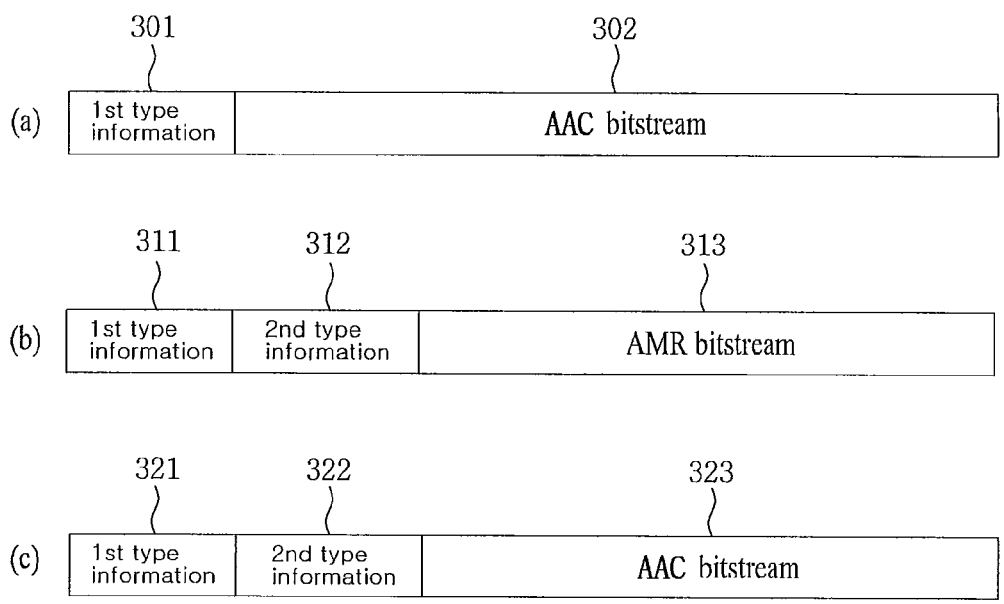
FIG. 5 is a diagram for an example of an audio bitstream structure coded according to the present invention.

FIG. 5 is a diagram for an example of an audio bitstream structure coded according to the present invention.

Referring to (a) of FIG. 5, an inputted audio signal corresponds to a music signal. First type information 301 is included in a bitstream only but second type information is not included therein. Within the bitstream, audio data coded by a coding type corresponding to the first type information 301 is included (e.g., AAC bitstream 302).

Referring to (b) of FIG. 5, an inputted audio signal corresponds to a speech signal. Both first type information 311 and second type information 312 are included in a bitstream. Within the bitstream, audio data coded by a coding type corresponding to the second type information 312 is included (e.g., AMR bitstream 313).

Referring to (c) of FIG. 5, an inputted audio signal corresponds to a mixed signal. Both first type information 321 and second type information 322 are included in a bitstream. Within the bitstream, audio data coded by a coding type corresponding to the second type information 322 is included (e.g., TCX applied AAC bitstream 323).

Regarding this description, the information included in an audio bitstream coded by the present invention is exemplarily shown in (a) to (c) of FIG. 5. And, it is apparent that various applications are possible within the range of the present invention. For instance, in the present invention, examples of AMR and AAC are taken as examples of coding schemes by adding information for identifying the corresponding coding schemes. Further, various coding schemes are applicable and coding identification information for identifying the various coding schemes are variously available as well. Besides, the present invention shown in (a) to (c) of FIG. 5 is applicable to one super frame, unit frame and subframe. Namely, the present invention is able to provide audio signal coding type information per preset frame unit.

In the following description, an audio signal coding method and apparatus, in which a coding processing process is included, according to another embodiment of the present invention are explained with reference to FIG. 2 and FIG. 3.

First of all, as a preprocessing process of an input signal using the linear prediction modeling unit 110, the psychoacoustic modeling unit 120 and the mixed signal modeling unit 130, a frequency bandwidth extending process and a channel number changing process can be performed.

For instance, as one embodiment of the frequency band extending process, a bandwidth preprocessing unit ('150' in FIG. 2) is able to generate a high frequency component using a low frequency component. As an example of the bandwidth processing unit, it is able to use SBR (spectral band replication) and HBE (high band extension), which are modified and enhanced.

Moreover, the channel number changing process reduces a bit allocation size by coding channel information of an audio signal into side information. As one embodiment of the channel number changing process, it is able to use a downmix channel generating unit ('140' in FIG. 2). The downmix channel generating unit 140 is able to adopt a PS (parametric stereo) system. In this case, PS is a scheme for coding a stereo signal and downmixes a stereo signal into a mono signal. The downmix channel generating unit 140 generates a downmix signal and spatial information relevant to reconstruction of the downmixed signal.

According to one embodiment, if a 48 kHz stereo signal is transferred using SBR and PS (parametric stereo), a mono 24 kHz signal remains through the SBR/PS. This mono signal can be encoded by an encoder. Thus, the input signal of the encoder has 24 kHz. This is because a high frequency component is coded by SBR and is downsampled into a half of a previous frequency. Thus, input signal becomes the mono signal. This is because a stereo audio is extracted as a parameter through the PS (parametric stereo) to be changed into a sum of the mono signal and an additional audio.

Figure 2:
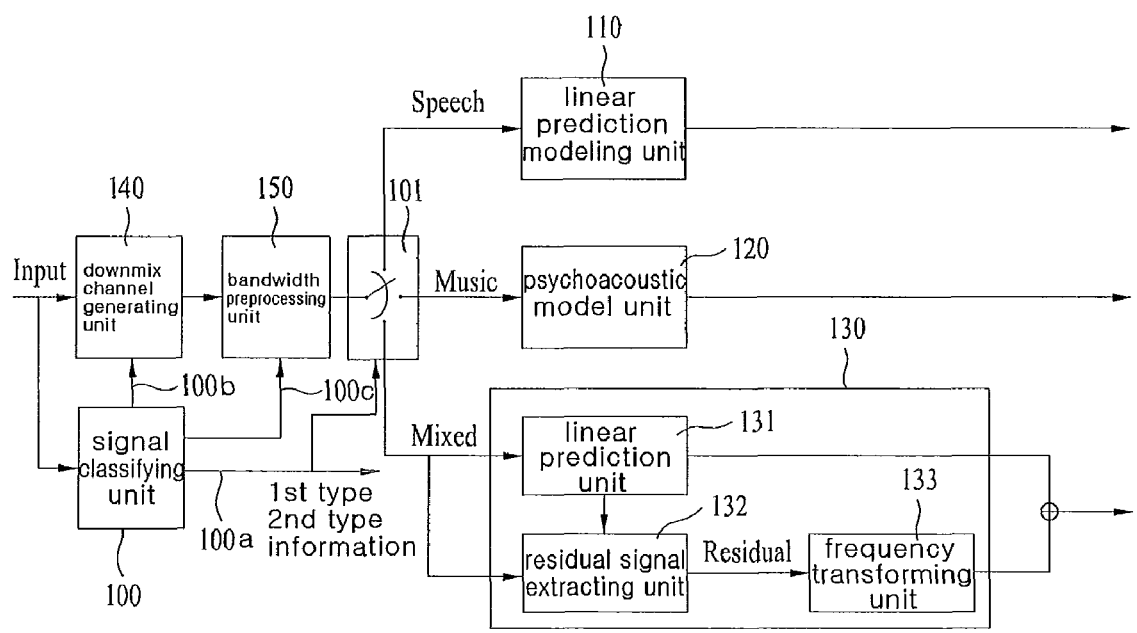
FIG. 2 is a block diagram of an audio coding apparatus according to another embodiment of the present invention.

FIG. 2 relates to a coding pre-processing process and shows a coding apparatus including the above-described downmix channel generating unit 140 and the above-described bandwidth preprocessing unit 150.

Operations of the linear prediction modeling unit 110, the psychoacoustic modeling unit 120, the mixed signal modeling unit 130 and the switching unit 101, which are described with reference to FIG. 1, are identically applied to operations of the corresponding elements shown in FIG. 2. Moreover, although the signal classifying unit 100 generates control signal for controlling an activation of the downmix channel generating unit 140 and the bandwidth preprocessing unit 150.

In other words, the signal classifying unit 100 further generates a control signal 100a for controlling an presence or non-presence of activation of the downmix channel generating unit 140 and an operative range of the downmix channel generating unit 140 and a control signal 100b for controlling an presence or non-presence of activation of the bandwidth preprocessing unit 150 and an operative range of the bandwidth preprocessing unit 150.

Figure 3:
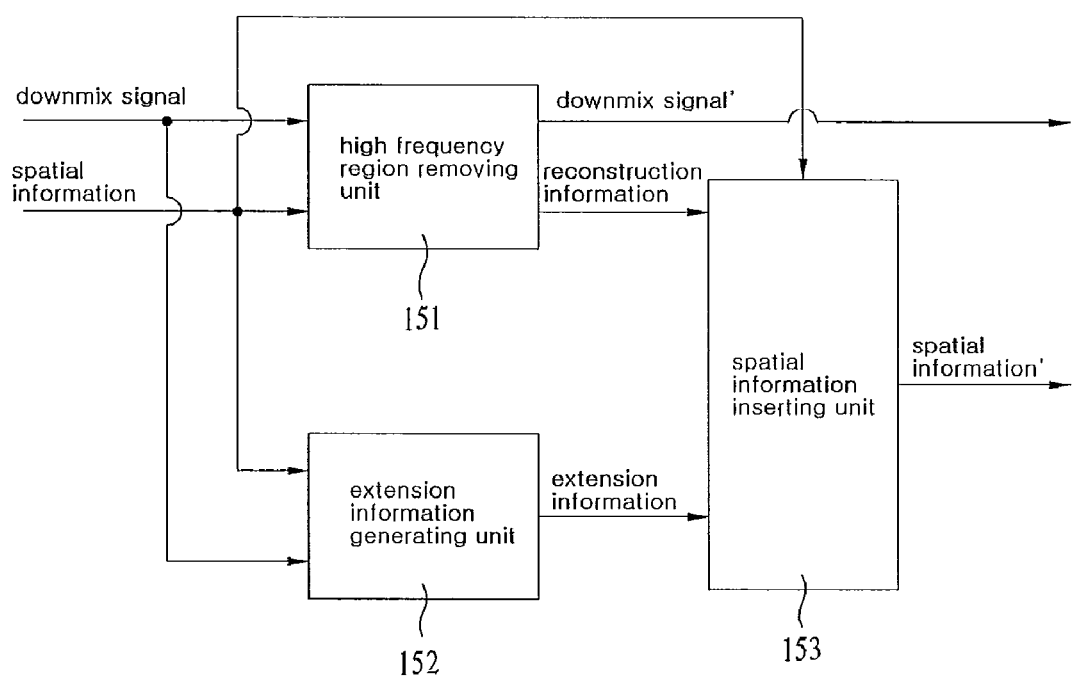
FIG. 3 is a detailed block diagram of a bandwidth preprocessing unit 150 according to an embodiment of the present invention.

FIG. 3 is a detailed block diagram of a bandwidth preprocessing unit 150 according to an embodiment of the present invention.

Referring to FIG. 3, a bandwidth preprocessing unit 150 for band extension includes a high frequency region removing unit 151, an extension information generating unit 152 and a spatial information inserting unit 153. The high frequency region removing unit 151 receives a downmix signal and spatial information from the downmix channel generating unit 140. The high frequency region removing unit 151 generates a low frequency downmix signal, which results from removing a high frequency signal corresponding to a high frequency region from a frequency signal of the downmix signal, and reconstruction information including a start frequency and end frequency of an extension base signal (described later).

In this case, it is able to determine the reconstruction information based on a characteristic of an input signal. Generally, a start frequency of a high frequency signal is a frequency amounting to a half of a whole bandwidth. On the contrary, according to a characteristic of an input signal, the reconstruction information can determine a start frequency as a frequency above or below a half of a whole frequency band. For instance, if using a whole bandwidth signal of the downmix signal is more efficient than encoding the downmix signal by removing a high frequency region using a bandwidth extension technique, the reconstruction information is able to represent a start frequency as a frequency located at an end of a bandwidth. It is able to determine the reconstruction information using at least one of a signal size, a length of segment used for coding and a type of a source, by which the present invention is non-limited.

The extension information generating unit 152 generates extension information for determining an extension base signal, which will be used for decoding, using the downmix signal and the spatial information generated by the downmix channel generating unit 140. The extension base signal is a frequency signal of a downmix signal, which is used to reconstruct the high frequency signal of the downmix signal removed by the high frequency region removing unit 151 in decoding. And, the extension base signal may be a low frequency signal or a partial signal of the low frequency signal. For instance, if is able to divide a low frequency signal into a low frequency band region and a middle frequency band region again by performing band-pass filtering on the downmix signal. In doing so, it is able to generate extension information using the low frequency band region only. A boundary frequency for discriminating the low frequency band region and the middle frequency band region can be set to a random fixed value. Alternatively, the boundary frequency can be variably set per frame according to information for analyzing a ratio of speech and music for a mixed signal.

The extension information may match information on a downmix signal not removed by the high frequency region removing unit 151, by which the present invention is non-limited. And, the extension information may be the information on a partial signal of the downmix signal. If the extension information is the information on a partial signal of the downmix signal, it can include a start frequency and an end frequency of the extension base signal and can further include a range of a filter applied to the frequency signal of the downmix signal.

The spatial information inserting unit 153 generates new spatial information resulting from inserting the reconstruction information generated by the high frequency region removing unit 121 and the extension information generated by the extension information generating unit 122 into the spatial information generated by the downmix channel generating unit 140.

Figure 6:
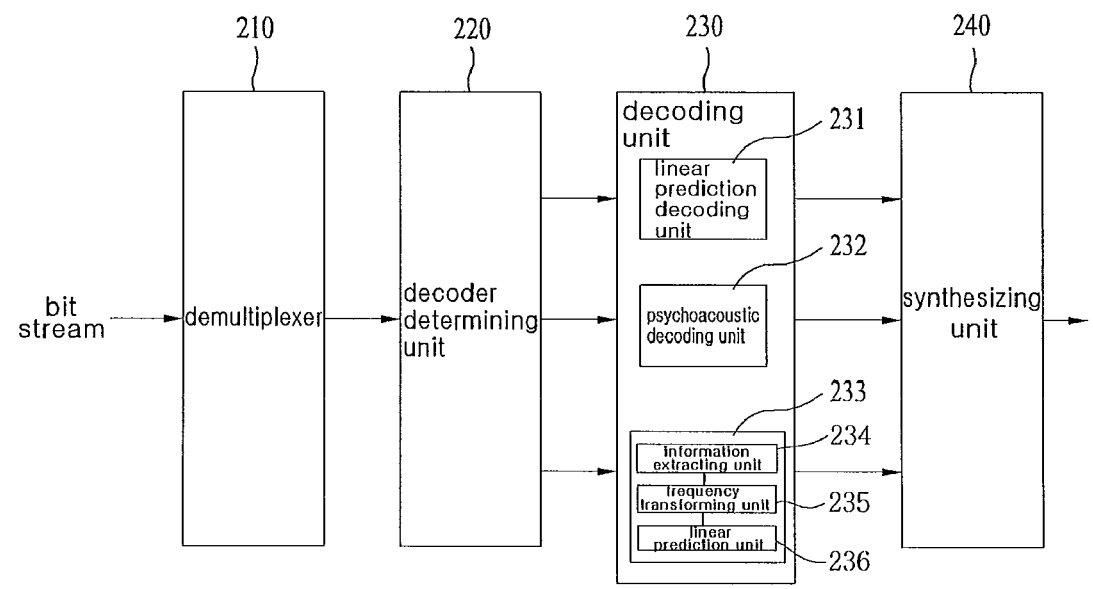
FIG. 6 is a block diagram of an audio decoding apparatus according to one embodiment of the present invention.

FIG. 6 is a block diagram of an audio decoding apparatus according to one embodiment of the present invention.

Referring to FIG. 6, a decoding apparatus is able to reconstruct a signal from an inputted bitstream by performing a process reverse to the coding process performed by the coding apparatus described with reference to FIG. 1. In particular, the decoding apparatus can include a demultiplexer 210, a decoder determining unit 220, a decoding unit 230 and a synthesizing unit 240. The decoding unit 230 can include a plurality of decoding units 231, 232 and 233 to perform decoding by different schemes, respectively. And, they are operated under the control of the decoder determining unit 220. In more particular, the decoding unit 230 can include a linear prediction decoding unit 231, a psychoacoustic decoding unit 232 and a mixed signal decoding unit 233. Moreover, the mixed signal decoding unit 233 can include an information extracting unit 234, a frequency transforming unit 235 and a linear prediction unit 236.

The demultiplexer 210 extracts a plurality of coded signals and side information from an inputted bitstream. In this case, the side information is extracted to reconstruct the signals. The demultiplexer 210 extracts the side information, which is included in the bitstream, e.g., first type information and second type information (just included if necessary) and then transfers the extracted side information to the decoder determining unit 220.

The decoder determining unit 220 determines one of decoding schemes within the decoding units 231, 232 and 233 from the received first type information and the received second type information (just included if necessary). Although the decoder determining unit 220 is able to determine the decoding scheme using the side information extracted from the bitstream, if the side information does not exist within the bitstream, the decoder determining unit 220 is able to determined scheme by an independent determining method. This determining method can be performed in a manner of utilizing the features of the aforesaid signal classifying unit (cf. '100' in FIG. 1).

The linear prediction decoder 231 within the decoding unit 230 is able to decode a speech signal type of an audio signal. The psychoacoustic decoder 233 decodes a music signal type of an audio signal. And, the mixed signal decoder 233 decodes a speech & music mixed type of an audio signal. In particular, the mixed signal decoder 233 includes an information extracting unit 234 extracting spectral data and a linear predictive coefficient from an audio signal, a frequency transforming unit 235 generating a residual signal for linear prediction by inverse-transforming the spectral data, and a linear prediction unit 236 generating an output signal by performing linear predictive coding on the linear predictive coefficient and the residual signal. The decoded signals are reconstructed into an audio signal before coding by being synthesized together by the synthesizing unit 240.

Figure 7:
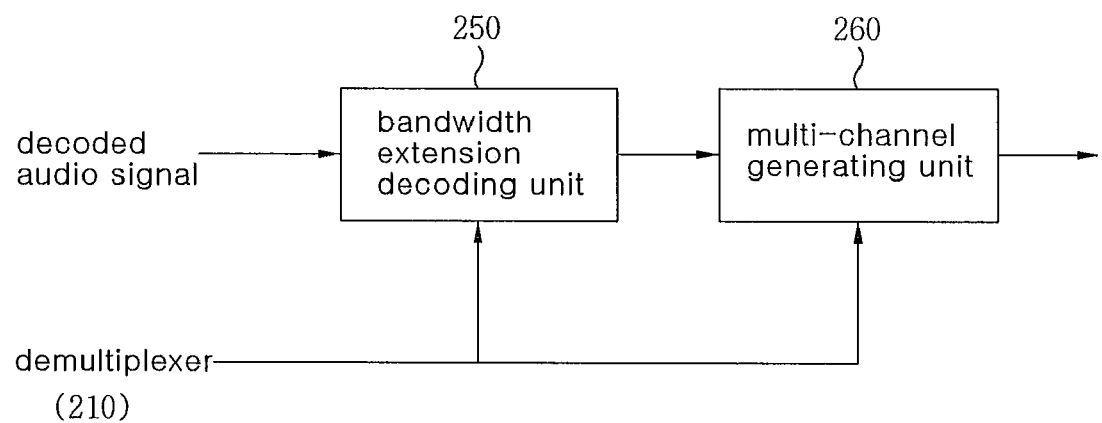
FIG. 7 is a block diagram of an audio decoding apparatus according to another embodiment of the present invention.

FIG. 7 shows a decoding apparatus according to one embodiment of the present invention, which relates to a post-processing process of a coded audio signal. The post-processing process means a process for performing bandwidth extension and channel number change for a decoded audio signal using one of the linear prediction decoding unit 231, the psychoacoustic decoding unit 232 and the mixed signal decoding unit 233. The post-processing process can include a bandwidth extension decoding unit 250 and a multi-channel generating unit 260 to correspond to the aforesaid downmix channel generating unit 140 and the aforesaid bandwidth preprocessing unit 150 shown in FIG. 2.

Figure 8:
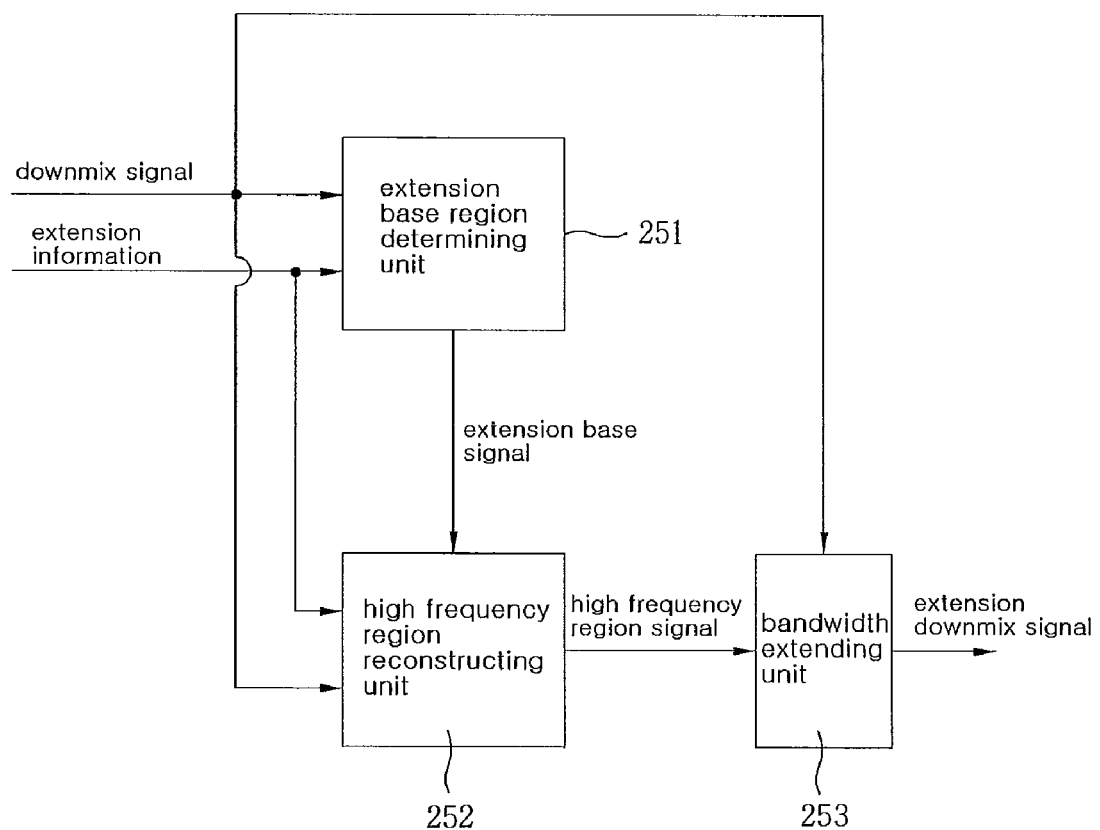
FIG. 8 is a detailed block diagram of a bandwidth extending unit 250 according to an embodiment of the present invention.

FIG. 8 shows a detailed configuration of the bandwidth extension decoding unit 250.

In a frequency band extending process, the demultiplexer 210 extracts the extension information generated by the bandwidth preprocessing unit 150 from the bitstream and the extracted extension information is utilized. And, spectral data of a different band (e.g., a high frequency band) is generated from a portion of the spectral data or the whole spectral data using the extension information included in the audio signal bitstream. In this case, units having similar characteristics can be grouped into a block in extending the frequency band. This is the same method of generating an envelope region by grouping type slots (or, samples) having a common envelope (or an envelope characteristic).

Referring to FIG. 8, a bandwidth extension decoding unit 250 includes an extension base region determining unit 251, a high frequency region reconstructing unit 252 and a bandwidth extending unit 253.

The extension region determining unit 251 determines an extension base region in a received downmix signal based on the received extension information and then generates an extension base signal as a result of the determination. The downmix signal may be a signal in a frequency domain and the extension base signal means a partial frequency region in the downmix signal of the frequency domain. Therefore, the extension information is used to determine the extension base signal and may include start and end frequencies of the extension base signal or a range of filter for filtering a portion of the downmix signal.

The high frequency region reconstructing unit 252 receives a downmix signal and extension information and also receives the extension base signal. The high frequency region reconstructing unit 252 is then able to reconstruct a high frequency region signal of the downmix signal, which was removed by the coding side, using the extension base signal and the extension information. The high frequency region signal may not be included in the downmix signal but may be included in an original signal. The high frequency region signal may not be an integer multiple of the downmix signal and a bandwidth of the high frequency region signal may not be equal to that of the extension base signal.

In a bandwidth extending apparatus and method according to one embodiment of the present invention, even if a reconstructed high frequency region is not an integer multiple of the downmix signal, it is able to use the bandwidth extending technique in a manner of using a signal corresponding to a partial frequency region in the downmix signal as the extension base signal instead of using the whole downmix signal of which high frequency region was removed by the coding side.

The high frequency region reconstructing unit 252 can further include a time extension downmix signal generating unit (not shown in the drawing) and a frequency signal extending unit (not shown in the drawing). The time extension downmix signal generating unit is able to extend the downmix signal into a time domain by applying the extension information to the extension base signal. The frequency signal extending unit is able to extend a signal in a frequency region of the downmix signal by reducing the sample number of the time extension downmix signal (decomation)

If the high frequency region reconstructing unit 252 includes a reconstructed high frequency region signal only but does not include a low frequency region signal, the bandwidth extending unit 253 generates an extension downmix signal, of which bandwidth is extended, by combining the downmix signal and the high frequency region signal together. The high frequency region signal may not be an integer multiple of the downmix signal. Therefore, the bandwidth extending technique according to one embodiment of the present invention is usable for upsampling into a signal now in a multiple relation.

The extension downmix signal, which is finally generated by the bandwidth extending unit 253, is inputted to the multi-channel generating unit 260 to be converted to a multi-channel signal.

Figure 11:
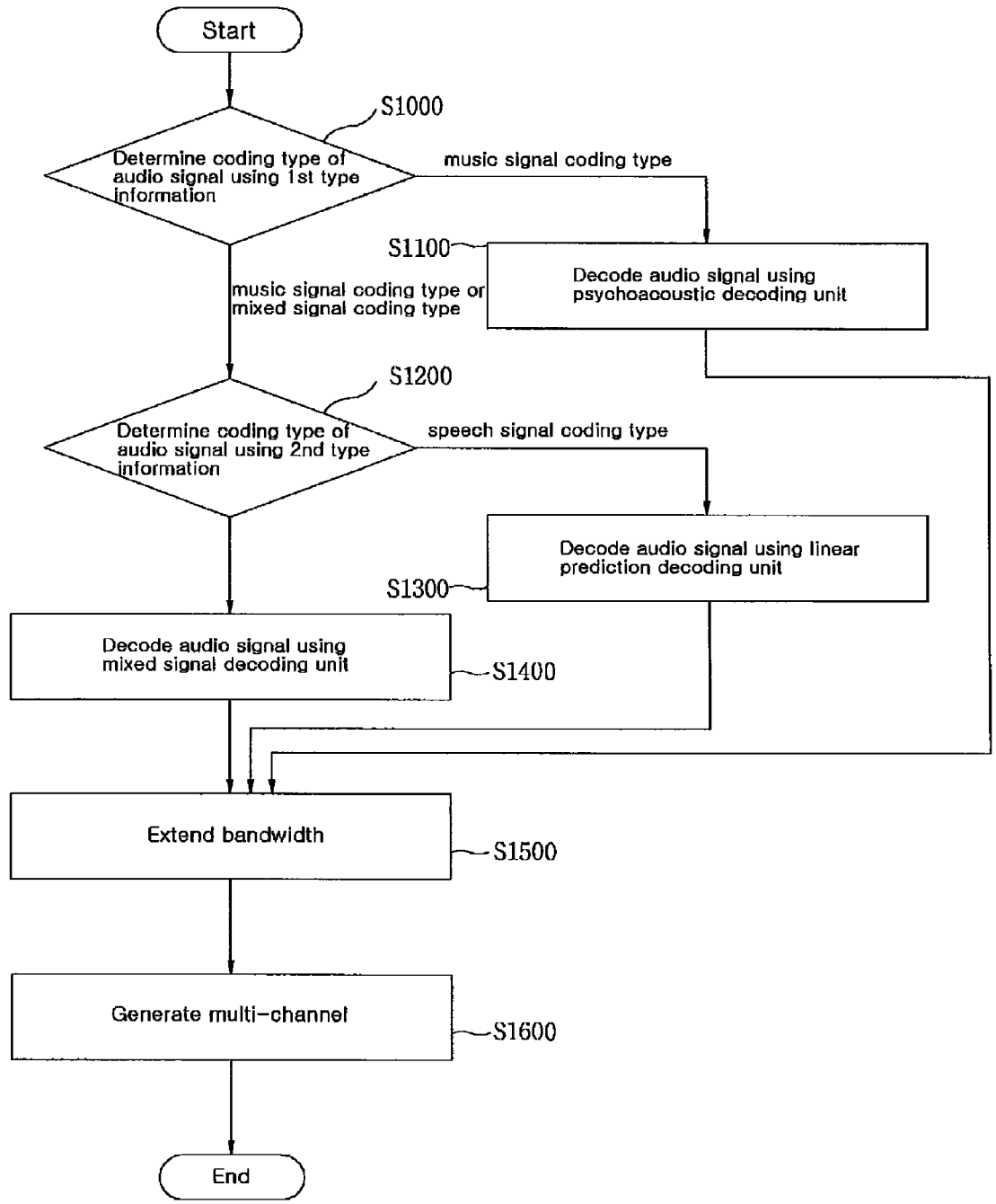
FIG. 11 is a flowchart for an audio decoding method according to one embodiment of the present invention.

In the following description, a decoding method according to the present invention is explained in detail with reference to a flowchart shown in FIG. 11.

First of all, the demultiplexer 210 extracts first type information and second type information (if necessary) from an inputted bitstream. Moreover, the demultiplexer 210 extracts informations (e.g., band extension information, reconstruction information, etc.) for a post-processing process. The decoder determining unit 220 determines a coding type of a received audio signal using the first type information of the extracted information in the first place [S1000]. If a coding type of the received audio signal is a music signal coding type, the psychoacoustic decoding unit 232 within the decoding unit 230 is utilized. A coding scheme applied per frame or subframe is determined according to the first type information. Decoding is then performed by applying a suitable coding scheme [S1100].

If it is determined that the coding type of the received audio signal is not the music signal coding type using the first type information, the decoder determining unit 220 determines whether the coding type of the received audio signal is a speech signal coding type or a mixed signal coding type using the second type information [S1200].

If the second type information means the speech signal coding type, the coding scheme applied per frame or subframe is determined by utilizing coding identification information extracted from the bitstream in a manner of utilizing the linear prediction decoding unit 231 within the decoding unit 230. Decoding is then performed by applying a suitable coding scheme [S1300].

If the second type information means the mixed signal coding type, the coding scheme applied per frame or subframe is determined by utilizing coding identification information extracted from the bitstream in a manner of utilizing the mixed signal decoding unit 233 within the decoding unit 230. Decoding is then performed by applying a suitable coding scheme [S1400].

Besides, as a post-processing of the audio signal decoding process using the linear prediction decoding unit 231, the psychoacoustic decoding unit 232 and the mixed signal decoding unit 233, a bandwidth extension decoding unit 250 can perform a frequency band extending process [S1500]. The frequency band extending process is performed in a manner that the bandwidth extension decoding unit 250 generates spectral data of a different band (e.g., a high frequency band) from a portion of the spectral data or the whole spectral data by decoding bandwidth extension information extracted from an audio signal bitstream.

Subsequently, the multi-channel generating unit 260 can perform a process for generating a multi-channel for the bandwidth-extended audio signal generated after the band extending process [S1600].

Figure 9:
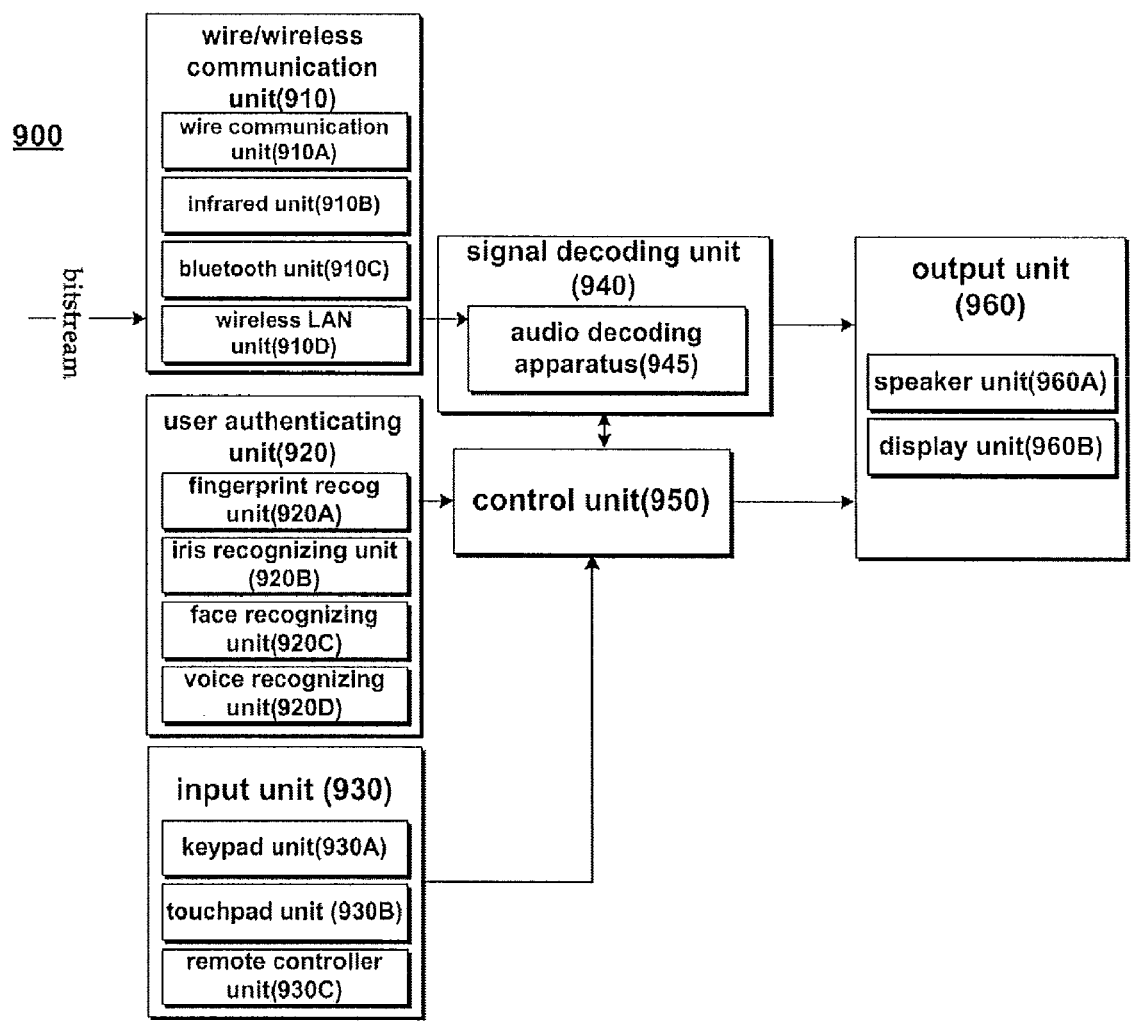
FIG. 9 is a diagram for a configuration of a product implemented with an audio decoding apparatus according to an embodiment of the present invention.
Figure 10:
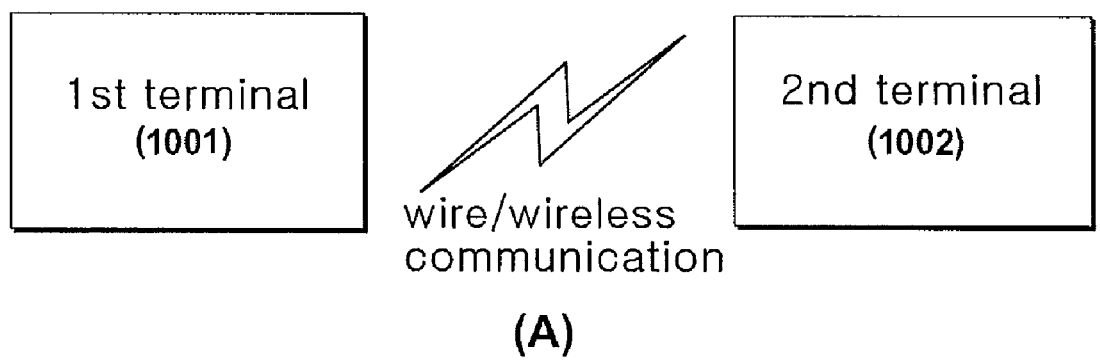
FIG. 10 is a diagram for an example of relations between products implemented with an audio decoding apparatus according to an embodiment of the present invention.
Figure 10:
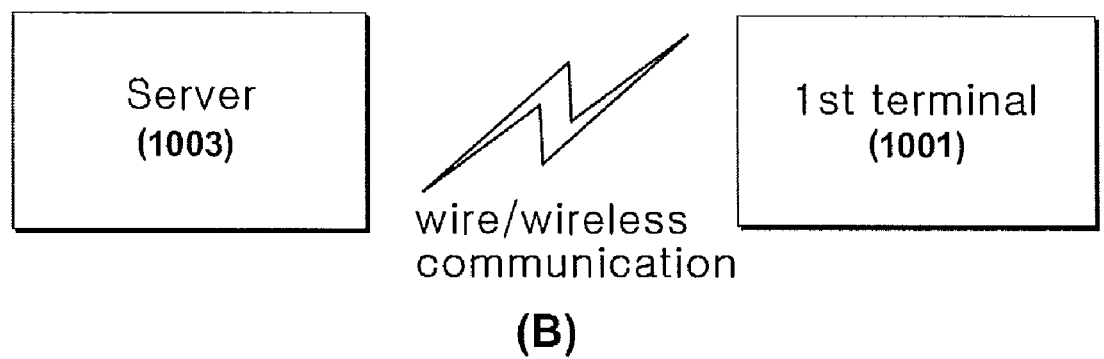

FIG. 9 is a diagram for a configuration of a product implemented with an audio decoding apparatus according to an embodiment of the present invention. And, FIG. 10 is a diagram for an example of relations between products implemented with an audio decoding apparatus according to an embodiment of the present invention.

Referring to FIG. 9, a wire/wireless communication unit 910 receives a bitstream through a wire/wireless communication system. In particular, the wire/wireless communication unit 910 can include at least one of a wire communication unit 910A, an IR (infrared) communication unit 910B, a Bluetooth unit 910C and a wireless LAN communication unit 910D.

A user authenticating unit 920 receives an input of user information and then performs user authentication. The user authenticating unit 920 can include at least one of a fingerprint recognizing unit 920A, an iris recognizing unit 920B, a face recognizing unit 920C and a speech recognizing unit 920D. The user authenticating unit 920 is able to perform the user authentication in a manner of inputting fingerprint/iris/face contour/speech information to the corresponding recognizing unit 920A/920B/920C/920D, converting the inputted information to user information and then determining whether the user information matches previously-registered user data.

An input unit 930 is an input device for enabling a user to input various kinds of commands. The input unit 930 is able to include at least one of a keypad unit 930A, a touchpad unit 930B and a remote controller unit 930C, by which the present invention is non-limited. A signal decoding unit 940 analyzes signal characteristics using a received bitstream and frame type information.

A signal decoding unit 940 may includes audio decoding apparatus 945 which may be audio decoding apparatus described with reference to FIG. 6. The audio decoding apparatus 945 decides at least one of different schemes and performs decoding using at least one of a linear prediction decoding unit, a psychoacoustic decoding unit and a mixed signal decoding unit. The signal decoding unit 940 outputs an output signal by decoding a signal using a decoding unit corresponding to the signal characteristic.

A control unit 950 receives input signals from input devices and controls all processes of the signal decoding unit 940 and an output unit 960. And, the output unit 960 is an element for outputting the output signal generated by the signal decoding unit 940 or the like. The output unit 960 is able to include a speaker unit 960A and a display unit 960B. If an output signal is an audio signal, it is outputted to a speaker. If an output signal is a video signal, it is outputted via a display.

FIG. 10 shows relations between a terminal and a server corresponding to the products shown in FIG. 9. Referring to (A) of FIG. 10, it can be observed that a first terminal 1001 and a second terminal 1002 are able to bi-directionally communicate with each other via a wire/wireless communication unit to exchange data and/or bitstreams. Referring to (B) of FIG. 10, it can be observed that a server 1003 and a first terminal 1001 are able to perform wire/wireless communications.

An audio signal processing method according to the present invention can be implemented into a program to be run in a computer and can be stored in a computer-readable recording medium. And, multimedia data having a data structure according to the present invention can be stored in a computer-readable recording medium as well. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). Moreover, a bitstream generated by the encoding method is stored in a computer-readable recording medium or can be transmitted via wire/wireless communication network.

Accordingly, the present invention provides the following effects or advantages.

First of all, the present invention classifies audio signals into different types and provides an audio coding scheme suitable for characteristics of the classified audio signals, thereby enabling more efficient compression and reconstruction of an audio signal.

While the present invention has been described and illustrated herein with reference to the preferred embodiments thereof, it will be apparent to those skilled in the art that various modifications and variations can be made therein without departing from the spirit and scope of the invention.

Thus, it is intended that the present invention covers the modifications and variations of this invention that come within the scope of the appended claims and their equivalents.

What is claimed is:

1. In an audio signal processing apparatus including an audio decoder, a method of processing an audio signal, comprising the steps of:
    identifying whether a coding type of the audio signal is a music signal coding type using first type information;
    if the coding type of the audio signal is not the music signal coding type, identifying whether the coding type of the audio signal is a speech signal coding type or a mixed signal coding type using second type information;
    if the coding type of the audio signal is the mixed signal coding type, extracting spectral data and a linear predictive coefficient from the audio signal;
    generating a residual signal for linear prediction by performing inverse frequency conversion on the spectral data;
    reconstructing the audio signal by performing linear prediction coding on the linear predictive coefficient and the residual signal; and
    reconstructing a high frequency region signal using an extension base signal corresponding to a partial region of the reconstructed audio signal and band extension information.

2. The method of claim 1, wherein the audio signal includes a plurality of subframes and wherein the second type information exists by a unit of the subframe.

3. The method of claim 1, wherein a bandwidth of the high frequency region signal is not equal to that of the extension base signal.

4. The method of claim 1, wherein the band extension information includes at least one of a filter range applied to the reconstructed audio signal, a start frequency of the extension base signal and an end frequency of the extension base signal.

5. The method of claim 1, wherein if the coding type of the audio signal is the music signal coding type, the audio signal comprises a frequency-domain signal, wherein if the coding type of the audio signal is the speech signal coding type, the audio signal comprises a time-domain signal, and wherein if the coding type of the audio signal is the mixed signal coding type, the audio signal comprises an MDCT-domain signal.

6. The method of claim 1, the linear predictive coefficient extracting step comprises the steps of:
    extracting a linear predictive coefficient mode; and
    extracting the linear predictive coefficient having a variable bit size corresponding to the extracted linear predictive coefficient mode.

7. An apparatus for processing an audio signal, comprising:
    a demultiplexer extracting first type information and second type information from a bitstream;
    a decoder determining unit identifying whether a coding type of the audio signal is a music signal coding type using first type information, the decoder, if the coding type of the audio signal is not the music signal coding type, identifying whether the coding type of the audio signal is a speech signal coding type or a mixed signal coding type using second type information, the decoder then determining a decoding scheme;
    an information extracting unit, if the coding type of the audio signal is the mixed signal coding type, extracting spectral data and a linear predictive coefficient from the audio signal;

a frequency transforming unit generating a residual signal for linear prediction by performing inverse frequency conversion on the spectral data;

a linear prediction unit reconstructing the audio signal by performing linear prediction coding on the linear predictive coefficient and the residual signal; and a bandwidth extension decoding unit reconstructing a high frequency region signal using an extension base signal corresponding to a partial region of the reconstructed audio signal and band extension information.

8. The apparatus of claim 7, wherein the audio signal includes a plurality of subframes and wherein the second type information exists by a unit of the subframe.

9. The apparatus of claim 7, wherein a bandwidth of the high frequency region signal is not equal to that of the extension base signal.

10. The apparatus of claim 7, wherein the band extension information includes at least one of a filter range applied to the reconstructed audio signal, a start frequency of the extension base signal and an end frequency of the extension base signal.

11. The apparatus of claim 7, wherein if the coding type of the audio signal is the music signal coding type, the audio signal comprises a frequency-domain signal, wherein if the coding type of the audio signal is the speech signal coding type, the audio signal comprises a time-domain signal, and wherein if the coding type of the audio signal is the mixed signal coding type, the audio signal comprises an MDCT-domain signal.

12. The apparatus of claim 7, the linear predictive coefficient extracting comprising:

extracting a linear predictive coefficient mode; and extracting the linear predictive coefficient having a variable bit size corresponding to the extracted linear predictive coefficient mode.

13. In an audio signal processing apparatus including an audio coder for processing an audio signal, a method of processing the audio signal, comprising the steps of:

removing a high frequency band signal of the audio signal and generating band extension information for reconstructing the high frequency band signal;

determining a coding type of the audio signal;

if the audio signal is a music signal, generating first type information indicating that the audio signal is coded into a music signal coding type;

if the audio signal is not the music signal, generating second type information indicating that the audio signal is coded into either a speech signal coding type or a mixed signal coding type;

if the coding type of the audio signal is the mixed signal coding type, generating a linear predictive coefficient by performing linear prediction coding on the audio signal;

generating a residual signal for the linear prediction coding;

generating a spectral coefficient by frequency-transforming the residual signal; and generating an audio bitstream including the first type information, the second type information, the linear predictive coefficient and the residual signal.

14. An apparatus for processing an audio signal, comprising:

a bandwidth preprocessing unit removing a high frequency band signal of the audio signal, the bandwidth preprocessing unit generating band extension information for reconstructing the high frequency band signal;

a signal classifying unit determining a coding type of the audio signal, the signal classifying unit, if the audio signal is a music signal, generating first type information indicating that the audio signal is coded into a music signal coding type, the signal classifying unit, if the audio signal is not the music signal, generating second type information indicating that the audio signal is coded into either a speech signal coding type or a mixed signal coding type;

a linear prediction modeling unit, if the coding type of the audio signal is the mixed signal coding type, generating a linear predictive coefficient by performing linear prediction coding on the audio signal;

a residual signal extracting unit generating a residual signal for the linear prediction coding; and a frequency transforming unit generating a spectral coefficient by frequency-transforming the residual signal.

15. The apparatus of claim 14, wherein the audio signal includes a plurality of subframes and wherein the second type information is generated per the subframe.

* * * * *